(12) United States Patent
Fang et al.

(10) Patent No.: US 8,711,792 B2
(45) Date of Patent: Apr. 29, 2014

(54) METHOD FOR MAPPING RESOURCE UNITS

(75) Inventors: Huiying Fang, Shenzhen (CN);
Hongyun Qu, Shenzhen (CN)

(73) Assignee: ZTE Corporation, Shenzen (CN)

( * ) Notice: Subject to any disclaimer, the term of this patent is extended or adjusted under 35 U.S.C. 154(b) by 346 days.

(21) Appl. No.: 13/127,989

(22) PCT Filed: Jul. 28, 2009

(86) PCT No.: PCT/CN2009/072942
§ 371 (c)(1),
(2), (4) Date: May 6, 2011

(87) PCT Pub. No.: WO2010/051704
PCT Pub. Date: May 14, 2010

(65) Prior Publication Data
US 2011/0211589 A1    Sep. 1, 2011

(30) Foreign Application Priority Data

Nov. 6, 2008 (CN) .......................... 2008 1 0225917

(51) Int. Cl.
*H04W 74/00* (2009.01)
(52) U.S. Cl.
USPC ............ 370/329; 370/330; 370/436; 370/437
(58) Field of Classification Search
None
See application file for complete search history.

(56) References Cited

U.S. PATENT DOCUMENTS

| | | | | |
|---|---|---|---|---|
| 8,204,021 | B2* | 6/2012 | Cho et al. | 370/330 |
| 8,208,441 | B2* | 6/2012 | Cho et al. | 370/330 |
| 8,254,247 | B2* | 8/2012 | Kang et al. | 370/208 |
| 8,451,866 | B2* | 5/2013 | Kim et al. | 370/476 |
| 2011/0223954 | A1* | 9/2011 | Guan et al. | 455/509 |

FOREIGN PATENT DOCUMENTS

| | | |
|---|---|---|
| CN | 101005341 | 7/2007 |
| CN | 101043492 | 9/2007 |
| CN | 101043495 | 9/2007 |

* cited by examiner

*Primary Examiner* — Robert Scheibel
(74) *Attorney, Agent, or Firm* — Graeser Associates International Inc; Dvorah Graeser

(57) ABSTRACT

A method for mapping resource units is disclosed. The method includes: dividing the physical resource unit set to obtain a first physical resource unit set which is in a unit of N1 continuous physical resource units, and a second physical resource unit set into which the remaining physical resource units are put; permuting, in a unit of N2 continuous physical resource units, the physical resource units in the second physical resource unit set; allocating, in a unit of N1 continuous physical resource units, the physical resource units in the first physical resource unit set to each frequency partition, and allocating, in a unit of one physical resource unit, the permuted physical resource units in the second physical resource unit set to each frequency partition. By using the invention, the combination of external mapping under the two-level sub-carrier mapping manner in the partial frequency multiplexing with the localized mapping and the distributed mapping can be realized.

8 Claims, 6 Drawing Sheets

METHOD FOR MAPPING RESOURCE UNITS

CROSS-REFERENCE TO RELATED APPLICATIONS

This application is the U.S. national phase application of PCT International Application No. PCT/CN2009/072942, filed on Jul. 28, 2009, which claims the benefit of priority from Chinese Application Serial No. 200810225917.6, filed on Nov. 6, 2008, all of which are hereby incorporated by reference in their entirety as if fully set forth herein.

FIELD OF THE INVENTION

The present invention relates to a technology of mapping resources in wireless communication, and in particular to a method for mapping resource units into frequency partition in a broadband wireless communication technology.

BACKGROUND OF THE INVENTION

With the continuous development of the broadband wireless communication technology, some next-generation broadband mobile communication systems such as Worldwide Interoperability for mobile Microwave Access (WiMAX), Ultra Mobile Broadband (UMB), 3GPP Long Term Evolution (LTE) and so on adopt a multiple access manner of the Orthogonal Frequency Division Multiple Access (OFDMA) in the downlink. In a given system bandwidth, and from the point view of the frequency domain, different users can achieve multiple access by occupying a certain amount of orthogonal sub-carrier resources.

The mapping manner of sub-carriers in the frequency domain can be classified into a localized mapping manner and a distributed mapping manner. In the original OFDMA system, all the sub-carriers on the frequency domain usually use one of the localized mapping manner and the distributed mapping manner on the same OFDM symbol. In the above, the sub-carrier resources in the resource block allocated to the user in the localized sub-carrier mapping manner are continuous; and the sub-carrier resources in the resource block allocated to the user in the distributed sub-carrier mapping manner are discrete, since it is needed to permute all the sub-carriers in the range of a frequency band through a permutation sequence in the distributed sub-carrier mapping manner. From the point of view of functions, the localized mapping manner can support a frequency selective scheduling, while the distributed mapping manner can generate the frequency diversity. Therefore, in the next-generation broadband wireless access system, the sub-carriers on the frequency domain will use a resource mapping manner of hybrid mapping of both the localized and the distributed mapping manners on the same OFDM symbol, so as to satisfy the requirements on the quality of service (QoS) of different services by different users.

In the evolution of an OFDMA multiple access system, in order to reduce the shared-frequency interference between cells, a partial frequency multiplexing technology is adopted, in which different frequency partitions respectively occupy certain sub-carrier resources. In the downlink of the OFDMA system using the partial frequency multiplexing technology, it is a trend of the development of the next-generation broadband wireless communication technology that combining the localized mapping and the distributed mapping with the partial frequency multiplexing technology. By making use of a two-level sub-carrier mapping manner, which consists of an external mapping based on the sub-carriers of the whole frequency band and an internal mapping based on the sub-carriers within the frequency partition, it is beneficial to use the advantages of both the localized mapping and the distributed mapping simultaneously, and realize the combination of the two kinds of mapping manners with the partial frequency multiplexing technology. In the above, the external mapping is executed aiming at the sub-carrier resources of the whole system frequency band, and maps the corresponding sub-carrier resources into each frequency partition; and the internal mapping is executed based on the sub-carrier resources within each frequency partition. However, currently, under the two-level sub-carrier mapping manner, there is no effective external mapping manner which is able to divide the sub-carrier resources and allocate the divided sub-carrier resources to each frequency partition flexibly according to the system configuration.

SUMMARY OF THE INVENTION

The present invention is provided considering the problems that there is no effective external mapping manner which is able to realize external mapping flexibly under the two-level sub-carrier mapping manner in the related technology. Therefore, the present invention is intended to provide a method for mapping resource units so as to resolve at least one of above problems.

To achieve the above objective, according to one aspect of the present invention, a method for mapping resource units is provided.

The method for mapping resource units according to the present invention includes:

dividing the physical resource unit set to obtain a first physical resource unit set which is in a unit of N1 continuous physical resource units, and a second physical resource unit set into which the remaining physical resource units are put;

permuting, in a unit of N2 continuous physical resource units, the physical resource units in the second physical resource unit set;

allocating, in a unit of N1 continuous physical resource units, the physical resource units in the first physical resource unit set to each frequency partition, and allocating, in a unit of one physical resource unit, the permuted physical resource units in the second physical resource unit set to each frequency partition.

Preferably, the dividing step is performed by a base station according to system configuration information.

Preferably, the system configuration information comprises: the number of frequency partitions, the number of sub-bands, each of which is in a unit of N1 continuous physical resource units, in each frequency partition.

Preferably, the system configuration information also comprises: system bandwidth, the number of physical resource units in the frequency partition.

Preferably, the step of dividing the physical resource unit set to obtain the first physical resource unit set in a unit of N1 continuous physical resource units specifically comprises: determining, according to the system configuration information, the number L of sub-bands divided from the physical resource unit set, wherein each of the sub-bands is in a unit of N1 continuous physical resource units; dividing, in a unit of N1 continuous physical resource units, the physical resource unit set in a system bandwidth into M sub-bands, wherein each sub-band is in a unit of N1 continuous physical resource units; extracting uniformly L sub-bands, each of which is in a unit of N1 continuous physical resource units, from the M sub-bands, and putting the extracted sub-bands into the first physical resource unit set.

Preferably, the step of dividing the physical resource unit set to obtain the first physical resource unit set in a unit of N1 continuous physical resource units specifically comprises: dividing, according to the number of the physical resource units in each frequency partition, the physical resource units in the physical resource unit set into parts, wherein the number of the parts is equivalent to the number of frequency partitions; in the part of physical resource units corresponding to each frequency partition, sequentially extracting (N1× pi) continuous physical resource units starting from the start unit, and putting the extracted physical resource units into the first physical resource unit set, wherein pi represents the number of sub-bands, each of which is in a unit of N1 continuous physical resource units, in the $i^{th}$ frequency partition.

Preferably, the value of N2 varies with system bandwidth.

Preferably, the value of N2 is 1 or 2.

Preferably, the step of allocating the physical resource units in the first physical resource unit set to each frequency partition is: sequentially allocating, according to the number of sub-bands, each of which is in a unit of N1 continuous physical resource units, in each frequency partition in the system configuration information, the physical resource units in a unit of N1 continuous physical resource units from the first physical resource unit set to each frequency partition.

Preferably, the method further includes: determining, according to the information of the number of physical resource units in each frequency partition and the number of sub-bands, each of which is in a unit of N1 continuous physical resource units, in each frequency partition in the system configuration information, the number of the physical resource units which need to be allocated to each frequency partition from the second physical resource unit set, and sequentially allocating the physical resource units to each frequency partition from the second physical resource unit set.

The method for mapping resource units provided by the present invention firstly divides the physical resource unit set to obtain a first physical resource unit set which is in a unit of N1 continuous physical resource units, and a second physical resource unit set which is in a unit of N2 continuous physical resource units, permutes the physical resource units in the second physical resource unit set, then sequentially allocates, in a unit of N1 continuous physical resource units, the physical resource units in the first physical resource unit set to each frequency partition, and sequentially allocates, in a unit of one physical resource unit, the permuted physical resource units in the second physical resource unit set to each frequency partition. Thus, it can not only realize the combination of external mapping under the two-level sub-carrier mapping manner in the partial frequency multiplexing with the localized mapping and the distributed mapping, but also can flexibly adjust the frequency selective scheduling gain and the frequency diversity gain of the carrier resources.

Since better frequency diversity gain can be achieved on discrete resources for some type of services scheduling, and the frequency selective scheduling gain can be achieved on localized resources for the services scheduling which require a lot of feedback, the method of the present invention is helpful for the flexible deployment of resources between the two kinds of gains, and can guarantee the user's need of different services to the maximum degree, so as to ensure that the users of different service type can achieve high throughput, and meet the requirements of the next-generation broadband mobile communication system.

The present invention provides a new method for mapping carrier resources, in which the resource units needing to be adjusted to be able to meet the requirements of frequency selective user data transmission and frequency non-selective user data transmission according to system configuration are divided and allocated to different frequency partitions, thus the method is more flexible.

Other features and advantages of the present invention will be described in the following description and partly become obvious from the specification, or be understood by implementing the present invention. The objects and other advantages of the present invention can be realized and obtained through the structures indicated by the description, claims and drawings.

BRIEF DESCRIPTION OF THE DRAWINGS

The drawings illustrated here provide a further understanding of the present invention and form a part of the present application. The exemplary embodiments and the description thereof are used to explain the present invention without unduly limiting the scope of the present invention, wherein.

DETAILED DESCRIPTION OF EMBODIMENTS

According to the technical solution provided by the present invention, the physical resource unit set is divided to obtain a first physical resource unit set which is in a unit of N1 continuous physical resource units and a second physical resource unit set which is in a unit of N2 continuous resource units. After the physical resource units in the second physical resource unit set are permuted, the physical resource units in the first physical resource unit set are sequentially allocated, in a unit of N1 continuous physical resource units, to each frequency partition, and the physical resource units in the second physical resource unit set are sequentially allocated, in a unit of one physical resource unit, to each frequency partition.

In the above, the division for obtaining the first physical resource unit set and the second physical resource unit set can be performed according to the system configuration information. The system configuration information can include: the number of frequency partitions, and the number of sub-bands, each of which is in a unit of N1 continuous physical resource units, in each frequency partition. The above sub-band refers to a set of continuous physical resource units. The system configuration information can also include: system bandwidth, and the number of the physical resource units in each frequency partition.

Figure 1:
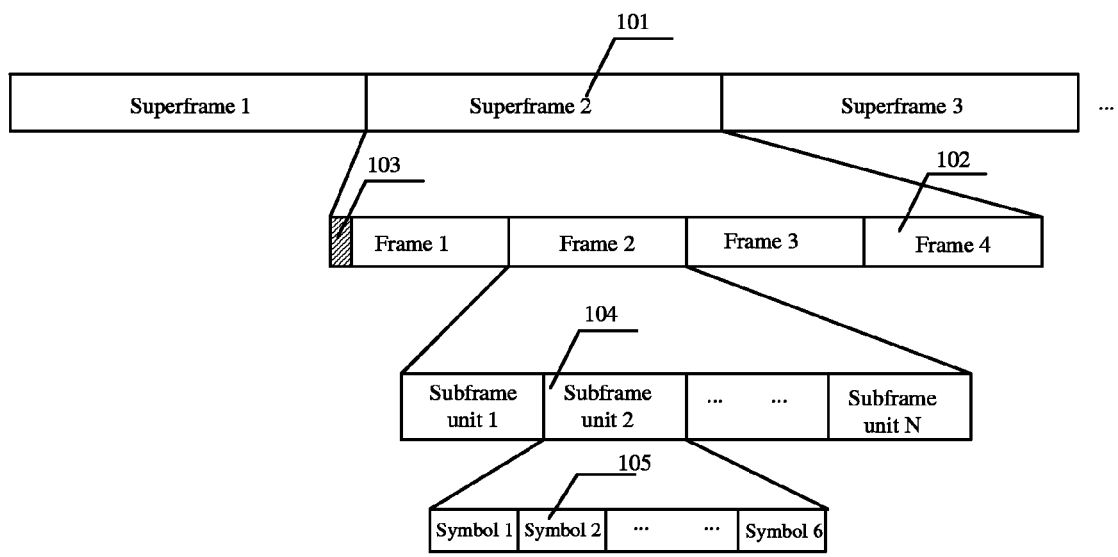
FIG. 1 is a schematic diagram of a frame structure adopted by the method for mapping resources of the present invention.

FIG. 1 is a schematic diagram of a frame structure adopted by the method for mapping resources of the present invention.

As shown in FIG. 1, the frame structure includes a certain amount of superframes 101, each of which consists of four unit frames 102. Superframe control information 103 is located on several symbols at the beginning of each superframe. Each unit frame 102 consists of eight subframe units 104, and each subframe unit 104 includes downlink subframe unit and uplink subframe unit which can be configured according to the specific circumstances of the system. Each subframe unit 104 is made up of six OFDM symbols 105.

Figure 2:
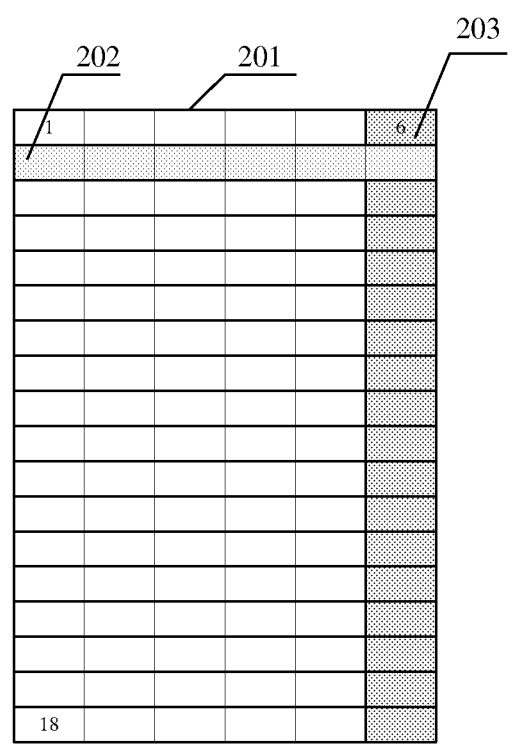
FIG. 2 is a schematic diagram of component structure of the physical resource unit (PRU) in the method for mapping resources of the present invention.

FIG. 2 is a schematic diagram of component structure of the physical resource unit in the method for mapping resources of the present invention. The physical resource unit is composed of eighteen orthogonal sub-carriers and $N_{sym}$ OFDM symbols. In the above, $N_{sym}$ is the number of the OFDM symbols in each subframe, and $N_{sym}$ can be 5, 6 or 7 and the value of which depends on the type of the subframe. In the FIG. 2, the vertical direction shows the number of the sub-carriers, and the horizontal direction shows the number of the OFDM symbols. The physical resource unit 201 shown in FIG. 2 is composed of eighteen orthogonal sub-carriers 202 and six OFDM symbols 203.

Method Embodiments

Figure 3:
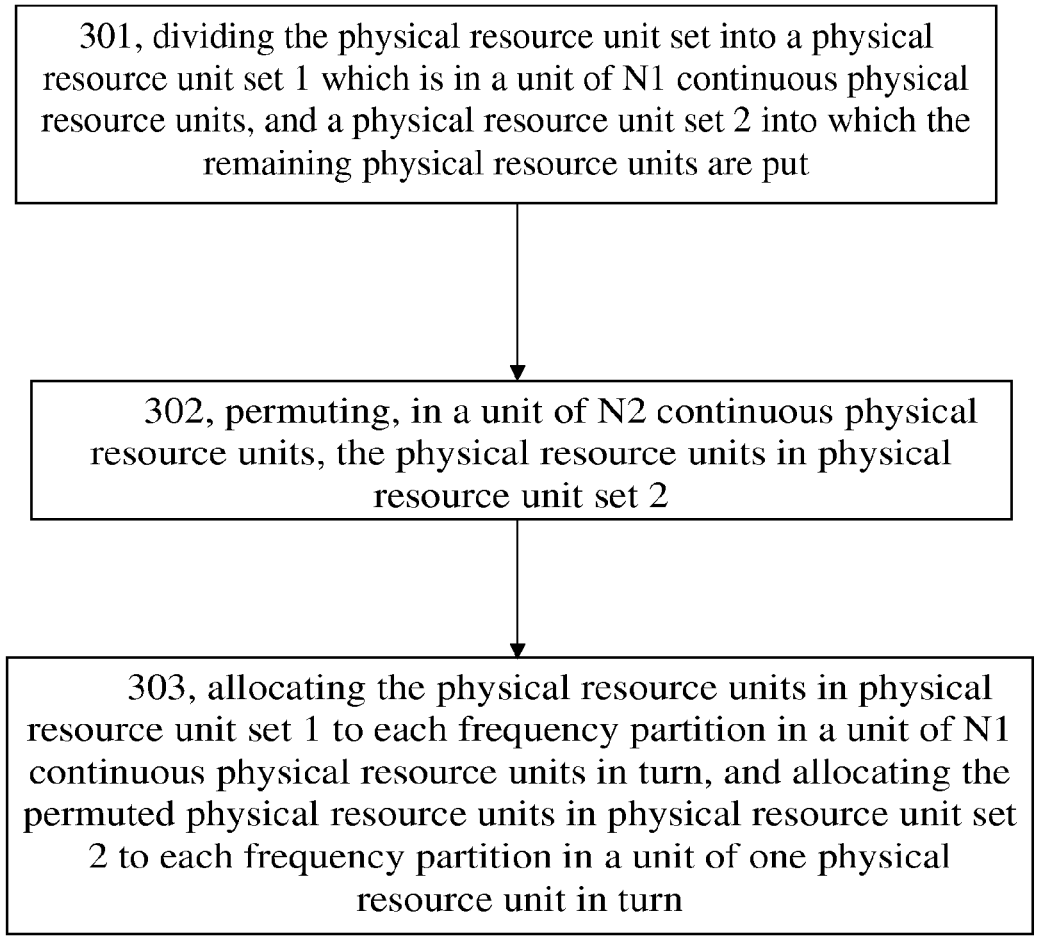
FIG. 3 is a schematic diagram of the realizing flow of the method for mapping resources according to an embodiment of the present invention.

FIG. 3 is a schematic diagram of the realizing flow of the method for mapping resources according to an embodiment of the present invention. The method includes the following steps 301 to 303.

Step 301: a base station divides, according to the system configuration information, the physical resource unit set to obtain a physical resource unit set 1 which is in a unit of N1 continuous physical resource units, and a physical resource unit set 2 into which the remaining physical resource units are put.

In the above, the system configuration information can include: the number of frequency partitions, and the number of the sub-bands, each of which is in a unit of N1 continuous physical resource units, in each frequency partition. The system configuration information can also include: system bandwidth, and the number of the physical resource units in each frequency partition.

Herein, the system configuration information needs to be broadcasted to each terminal under the base station.

There are two methods to realize the step of dividing the physical resource unit set to obtain the physical resource unit set 1 which is in a unit of N1 continuous physical resource units. The first method is suitable for the circumstance that the sub-band which is in a unit of N1 continuous physical resource units is not directly mapped, and the second method is suitable for the circumstance that the sub-band which is in a unit of N1 continuous physical resource units is directly mapped.

Specifically, the processing procedure of the above first method is described as follows.

Firstly, the number L of sub-bands divided from the physical resource unit set is determined according to the system configuration information, wherein each of the sub-bands is in a unit of N1 continuous physical resource units, and L is the sum of the number of sub-bands, each of which is in a unit of N1 continuous physical resource units, in each frequency partition in the system configuration information.

Then, the physical resource unit set in a system bandwidth is divided, in a unit of N1 continuous physical resource units, into M sub-bands $P_0, P_1, \ldots P_{M-1}$, wherein each sub-band is in a unit of N1 continuous physical resource units, $M = \lfloor N/N1 \rfloor$, N is the total number of sub-bands in the physical resource unit set, and $\lfloor \ \rfloor$ denotes floor rounding; L sub-bands $P_0, P_T, \ldots P_{T*(L-1)}$, each of which is in a unit of N1 continuous physical resource units, are extracted uniformly from the M sub-bands $P_0, P_1, \ldots P_{M-1}$, and are put into the physical resource unit set 1, wherein the extraction interval is $T = \lfloor M/L \rfloor$.

The processing procedure of the above second method is described as follows.

According to the number $n_i$ of the physical resource units in each frequency partition and the number $p_i$ of sub-bands, each of which is in a unit of N1 continuous physical resource units, in each frequency partition, the physical resource unit set is divided to obtain the physical resource unit set 1 which is in a unit of N1 continuous physical resource units. The above sub-bands, each of which is in a unit of N1 continuous physical resource units, are used for the direct mapping of sub-carriers. In the above, $n_i$ denotes the number of the physical resource units in the $i^{th}$ frequency partition, and $p_i$ denotes the number of the sub-bands, each of which is in a unit of N1 continuous physical resource units, in the $i^{th}$ frequency partition.

That is, according to the number of the physical resource units in each frequency partition, the physical resource units in the physical resource unit set are divided into several parts, the number of which is equivalent to the number of frequency partitions; in the part of physical resource units corresponding to each frequency partition, (N1×pi) continuous physical resource units are sequentially extracted starting from the start unit, and put into the physical resource unit set 1.

Step 302: permutation is performed in a unit of N2 continuous physical resource units on the physical resource units in the physical resource unit set 2.

In the above, the value of N2 is less than that of N1. The value of N2 varies according to the change of system bandwidth. Specifically, the value of N2 can be 1 or 2, according to the change of system bandwidth. The value of N2 is 2 when the system bandwidth is large, and the value of N2 is 1 when the system bandwidth is small. For example, the value of N2 is 1 when the system bandwidth is 5M and 10M, and the value of N2 is 2 when the system bandwidth is 20M.

Step 303: according to the system configuration information, the physical resource units in the physical resource unit set 1 are sequentially allocated to each frequency partition in a unit of N1 continuous physical resource units, and the permuted physical resource units in the physical resource unit set 2 are sequentially allocated to each frequency partition in a unit of one physical resource unit.

Herein, according to the number of sub-bands, each of which is in a unit of N1 continuous physical resource units, in each frequency partition in the system configuration information, the physical resource units in the physical resource unit set 1 are sequentially allocated, in a unit of N1 continuous physical resource units, to each frequency partition.

Further, according to the information of the number of the physical resource units in each frequency partition and the number of sub-bands, each of which is in a unit of N1 continuous physical resource units, in each frequency partition in the system configuration information, the number of the physical resource units which need to be allocated to each frequency partition from the physical resource unit set 2 is determined, and the physical resource units are sequentially allocated to each frequency partition from the physical resource unit set 2.

In the following, taking a broadband cellular wireless communication system as an example, the method for mapping resource units in the present invention will be further described in detail in combining with the figures and the embodiment.

Figure 4:
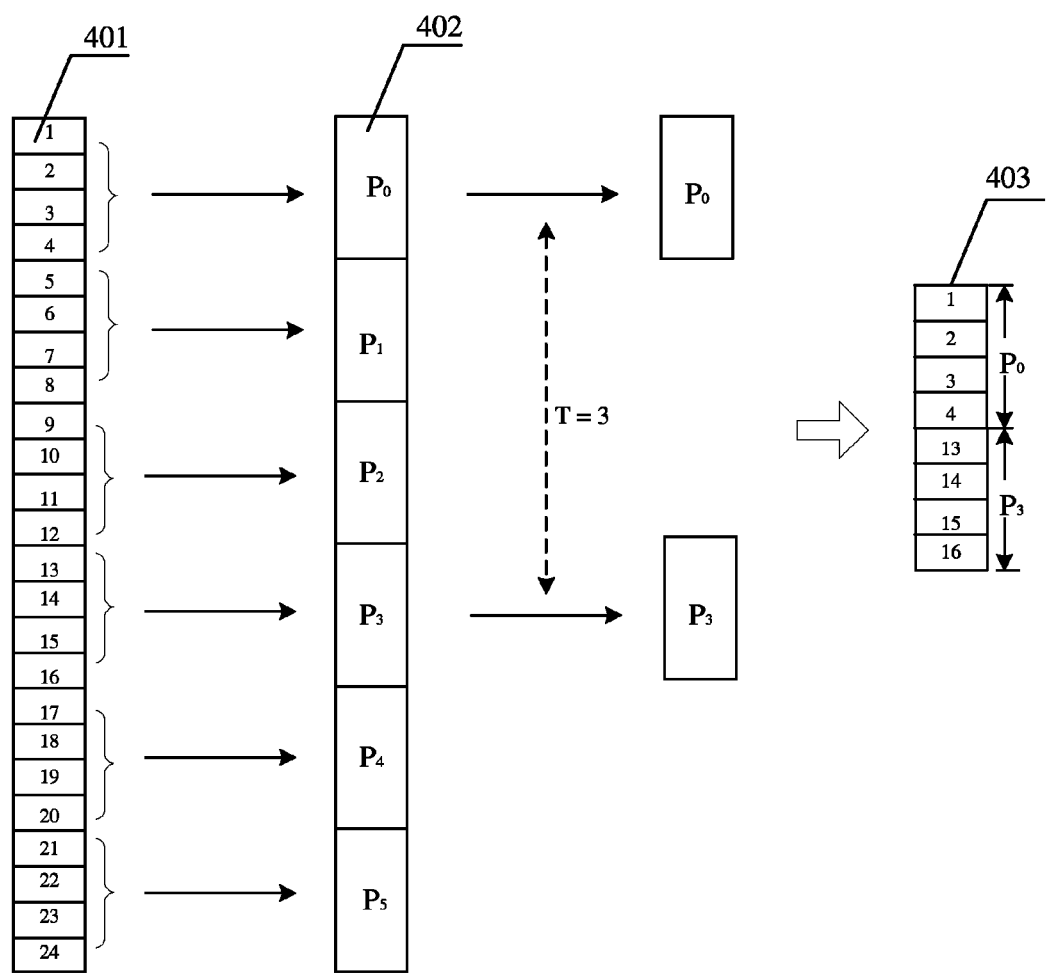
FIG. 4 is a schematic diagram of the process of dividing the physical resource unit set to obtain a physical resource unit set 1 which is in a unit of N1 continuous physical resource units in the present invention.

FIG. 4 is a the schematic diagram of the process of dividing the physical resource unit set to obtain a physical resource unit set 1 which is in a unit of N1 continuous physical resource units in the present invention. As shown in FIG. 4, the method for dividing the above resource units is described as follows.

According to the system configuration information, the number L of sub-bands divided from the physical resource unit set is determined, wherein each of the sub-bands is in a unit of N1 continuous physical resource units, L is the sum of the number of sub-bands, each of which is in a unit of N1 continuous physical resource units, in each frequency partition in the system configuration information; the physical resource unit set in a system bandwidth is divided, in a unit of N1 continuous physical resource units, into M sub-bands $P_0$, $P_1, \ldots P_{M-1}$, wherein each of the sub-bands is in a unit of N1 continuous physical resource units, M=⌊N/N1⌋, ⌊ ⌋ denotes floor rounding; L sub-bands $P_0, P_T, \ldots P_{T^*(L-1)}$, each of which is in a unit of N1 continuous physical resource units, are extracted uniformly from the M sub-bands $P_0, P_1, \ldots P_{M-1}$, and are put into the physical resource unit set 1.

As shown in FIG. 4, assuming that the system bandwidth is 5 MHz and N1 equals to 4, in the broadband wireless access system using the OFMMA multiple access manner, the 5M bandwidth comprises 432 available sub-carriers in all. According to the frame structure as shown in FIG. 1, the subframe unit 104 is made up of six OFDMA symbols, then the subframes of 5M broadband can be divided into 24 physical resource units 401 according to the physical resource units 201 as shown in FIG. 2.

Assuming that there are three frequency partitions in system configuration: the first frequency partition, the second frequency partition and the third frequency partition, and that the first frequency partition and the second frequency partition each comprise one sub-band which is in a unit of 4 physical resource units, then the number of sub-bands, each of which is in a unit of 4 physical resource units, divided from the physical resource unit set is 2. Specifically, firstly, the 24 physical resource units 401 are divided, in a unit of 4 physical resource units, into M (M=6) sub-bands 402, which are respectively denoted as $P_0, P_1, P_2, P_3, P_4$ and $P_5$; taking T=3 sub-bands as an interval, two sub-bands $P_0$ and $P_3$, each of which is in a unit of 4 physical resource units, are extracted evenly, and put into physical resource unit set 403 (that is, the physical resource unit set 1), then the physical resource units in physical resource unit set 403 are 1, 2, 3, 4, 12, 13, 14 and 15 in turn.

Figure 5:
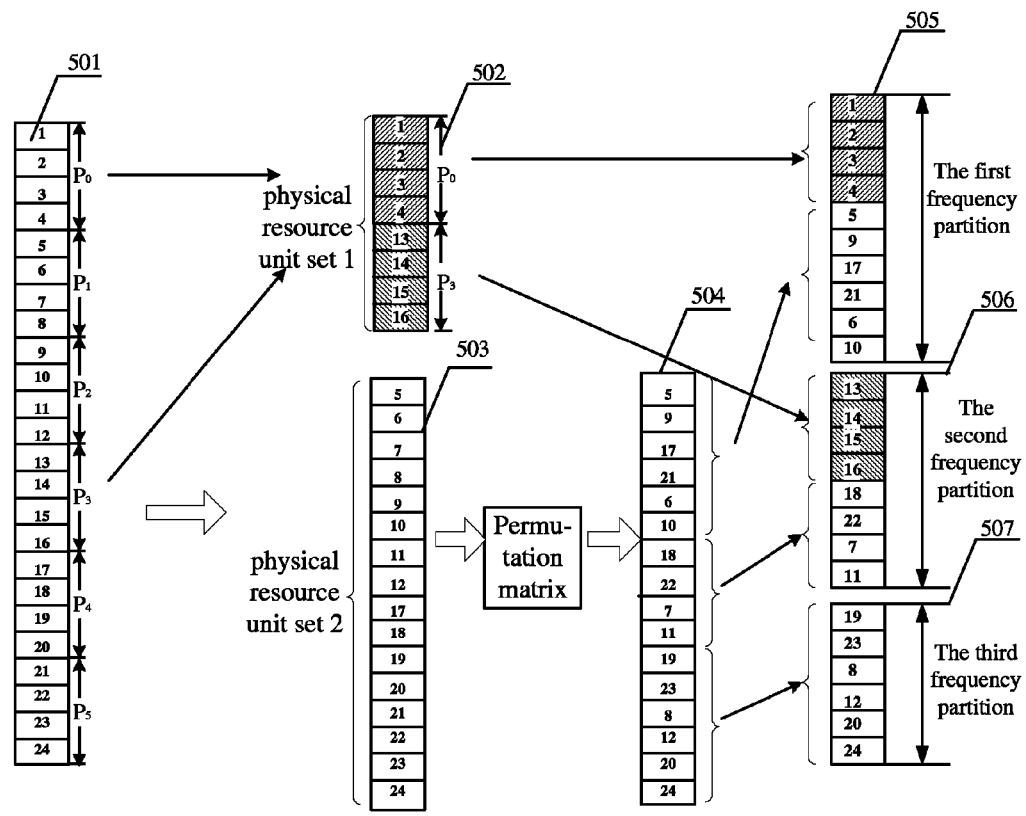
FIG. 5 is a schematic diagram of the process of mapping the physical resource units in the physical resource unit set into each frequency partition of the present invention.

FIG. 5 is a schematic diagram of the process of mapping the physical resource units in the physical resource unit set into each frequency partition of the present invention. In FIG. 5, still taking the 5M bandwidth as an example, there are totally 24 physical resource units 501 in the 5M bandwidth, and there are three frequency partitions in system configuration: the first frequency partition 505, the second frequency partition 506 and the third frequency partition 507. Herein, the first frequency partition 505 and the second frequency partition 506 each comprise one sub-band which is in a unit of 4 physical resource units. The first frequency partition 505 comprises 10 physical resource units 501, the second frequency partition 506 comprises 8 physical resource units 501, and the third frequency partition 507 comprises 6 physical resource units 501. The system configuration information needs to be broadcasted to each terminal by the base station. The composition of the system configuration information is as shown in table 1:

TABLE 1

| Field name | Bits | Description |
| --- | --- | --- |
| System bandwidth | 4 | 5 MHz-40 MHz |
| The number of Frequency partitions | 2 | 1, 2, 3 |
| The number of sub-bands in a unit of N1 continuous PRUs in each frequency partition | The number of Frequency partitions × n | N is to be determined |
| The number of physical resource units in each frequency partition | (The number of Frequency partitions − 1) × m | M is to be determined. The total number of physical resource units can be obtained according to the total bandwidth, thus it is only needed to broadcast the number of physical resource units of (Number of Frequency partitions − 1) of frequency partitions |

In external mapping, the 24 physical resource units are divided, in a unit of 4 physical resource units, into M(M=6) sub-bands, which are respectively denoted as $P_0, P_1, P_2, P_3, P_4$ and P. With T=3 sub-bands as an interval, two sub-bands $P_0$ and $P_3$, each of which is in a unit of 4 physical resource units, are extracted evenly, and put into physical resource unit set 502 (that is, the physical resource unit set 1). The remaining physical resource units are sequentially put into physical resource unit set 503 (that is, the physical resource unit set 2).

The rows and columns of the physical resource units in physical resource unit set 503 are permuted in a unit of one physical resource unit through a permutation matrix to obtain the permuted physical resource unit set 504. A system-configured number of sub-bands are sequentially extracted from physical resource unit set 502 in a unit of 4 physical resource units and mapped into each frequency partition, e.g. $P_0$ is put into the first frequency partition 505, and $P_3$ is put into the second frequency partition 506.

Since the first frequency partition 505, the second frequency partition 506 and the third frequency partition 507 contain 10, 8 and 6 physical resource units 501 respectively, from the physical resource unit set 504 and in a unit of one physical resource unit, 6 physical resource units 501 are extracted and mapped into the first frequency partition 505, 4 physical resource units 501 are extracted and mapped into the second frequency partition 506, and 6 physical resource units 501 are extracted and mapped into the third frequency partition 507. Then, after the resource mapping, the unit sequence numbers of the physical resource units 501 in the first frequency partition 505 are 1, 2, 3, 4, 5, 9, 17, 21, 6, 10 in turn; the unit sequence numbers of the physical resource units 501 in the second frequency partition 506 are 13, 14, 15, 16, 18, 22, 7, 11 in turn; the unit sequence numbers of the physical resource units 501 in the third frequency partition 507 are 19, 23, 8, 12, 20, 24 in turn.

Figure 6:
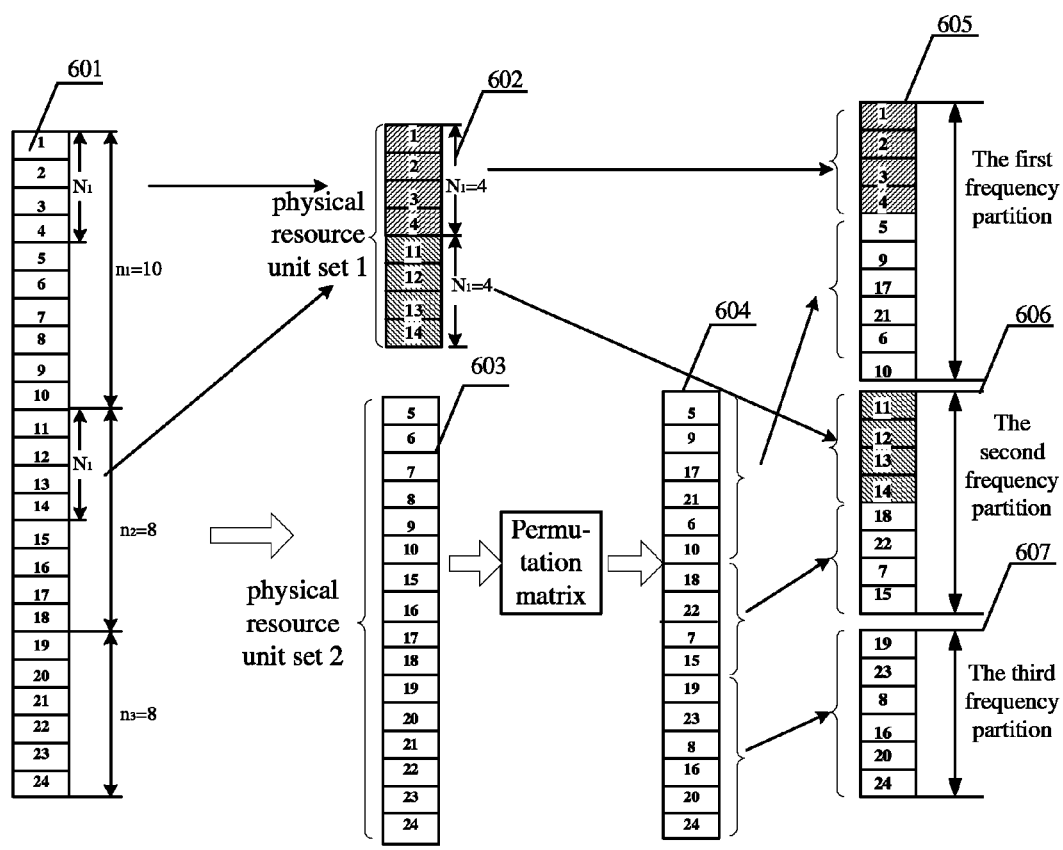
FIG. 6 is a schematic diagram of the process of mapping the physical resource units in the physical resource unit set into each frequency partition in the case of sub-carrier direct mapping.

FIG. 6 is a schematic diagram of the process of mapping the physical resource units in the physical resource unit set into each frequency partition under the case of sub-carrier direct mapping. According to the number $n_i$ of the physical resource units in each frequency partition and the number $p_i$ of sub-bands, each of which is in a unit of N1 continuous physical resource units, in each frequency partition, the physical resource unit set is divided to obtain the physical resource unit set 1 which is in a unit of N1 continuous physical resource units. The above sub-bands, each of which is in a unit of N1 continuous physical resource units, are used for the direct mapping of sub-carriers. In the above, $n_i$ denotes the number of the physical resource units in the $i^{th}$ frequency partition, and $p_i$ denotes the number of the sub-bands, each of which is in a unit of N1 continuous physical resource units, in the $i^{th}$ frequency partition. According to the number of the physical resource units in each frequency partition, the physical resource units in the physical resource unit set are divided into several parts, the number of which is equivalent to the number of frequency partitions; in the part of physical resource units corresponding to each frequency partition, (N1×pi) continuous physical resource units are sequentially extracted starting from the start unit, and put into the physical resource unit set 1.

In FIG. 6, still as exemplified by 5M bandwidth, there are totally 24 physical resource units 601 in the 5M bandwidth, and there are three frequency partitions in system configuration: the first frequency partition 605, the second frequency partition 606 and the third frequency partition 607. Herein, the first frequency partition 605 and the second frequency partition 606 respectively comprise one sub-band in a unit of 4 physical resource units. The first frequency partition 605 comprises 10 physical resource units 601, the second frequency partition 606 includes 8 physical resource units 601, and the third frequency partition 607 contains 6 physical resource units 601.

According to the number of 10, 8 and 6 of physical resource units 601 contained respectively in the first frequency partition 605, the second frequency partition 606 and the third frequency partition 607, the physical resource units in the physical resource unit set are divided into three parts, the number of which is equivalent to the number of the frequency partitions. That is, the first frequency partition 605 corresponds to the physical resource units 1~10, the second frequency partition 606 corresponds to the physical resource units 11~18, and the third frequency partition 607 corresponds to the physical resource units 19~24. In the part of physical resource units corresponding to the first frequency partition 605, the four physical resource units 1, 2, 3, 4, starting from the start unit, are put into the physical resource unit set 1; in the part of physical resource units corresponding to the second frequency partition 606, the four physical resource units 11, 12, 13, 14 starting from the start unit are put into the physical resource unit set 1; the remaining physical resource units are put into physical resource unit set 603 (that is, the physical resource unit set 2).

The rows and columns of the physical resource units in physical resource unit set 603 are permuted in a unit of one physical resource unit through a permutation matrix, and the permuted physical resource unit set 604 is obtained. From the physical resource unit set 602, four physical resource units are sequentially extracted and put into the first frequency partition 605, and four physical resource units are extracted and put into the second frequency partition 606.

Since the first frequency partition 605, the second frequency partition 606 and the third frequency partition 607 contain 10, 8 and 6 physical resource units 601 respectively, then, from the physical resource unit set 604 and in a unit of one physical resource unit, 6 physical resource units are extracted and mapped into the first frequency partition 606, 6 physical resource units are extracted and mapped into the second frequency partition 606, and then the remaining 6 physical resource units 601 are mapped into the third frequency 607. Finally, after the resource mapping, the unit sequence numbers of the physical resource units 601 in the first frequency partition 605 are 1, 2, 3, 4, 5, 9, 17, 21, 6, 10 in turn; the unit sequence numbers of the physical resource units 601 in the second frequency partition 606 are 13, 14, 15, 16, 18, 22, 7, 11 in turn; the unit sequence numbers of the physical resource units 601 in the third frequency partition 607 are 19, 23, 8, 12, 20, 24 in turn.

It is concluded from the above descriptions that the combination of external mapping in the two-level sub-carrier mapping manner in the partial frequency multiplexing with the localized mapping and the distributed mapping can be realized.

According to an embodiment of the present invention, there is provided a kind of computer readable medium, in which computer executable instructions are stored. When the instructions are executed by a computer or a processor, the computer or the processor is made to implement the processing of steps S301 to S303 as shown in FIG. 3. Preferably, it can implement the above embodiments.

Besides, the realization of the present invention doesn't change the system structure and the current process flow, and thus is easy to realize and easy to be promoted in the technology field. It has relatively strong industrial applicability.

The descriptions above are only preferable embodiments of the present invention, which are not used to restrict the scope of the present invention. Any amendments, equivalent substitutions, improvements etc. within the spirit and principle of the present invention are all included in the scope of the present invention.

What is claimed is:

1. A method for mapping resource units, comprising:
   dividing physical resource unit set to obtain a first physical resource unit set which is in a unit of N1 continuous physical resource units, and a second physical resource unit set into which the remaining physical resource units are put;
   permuting, in a unit of N2 continuous physical resource units, the physical resource units in the second physical resource unit set;
   allocating, in a unit of N1 continuous physical resource units, the physical resource units in the first physical resource unit set to each frequency partition, and allocating, in a unit of one physical resource unit, the permuted physical resource units in the second physical resource unit set to each frequency partition;
   wherein the step of dividing the physical resource unit set to obtain the first physical resource unit set in a unit of N1 continuous physical resource units is performed by a base station according to system configuration information and comprises:
   dividing, according to the number of the physical resource units in each frequency partition, the physical resource units in the physical resource unit set into parts, wherein the number of the parts is equivalent to the number of frequency partitions; in the part of physical resource units corresponding to each frequency partition, sequentially extracting (N1×pi) continuous physical resource units starting from the start unit, and putting the extracted physical resource units into the first physical resource unit set, wherein pi represents the number of sub-bands, each of which is in a unit of N1 continuous physical resource units, in the $i^{th}$ frequency partition.

2. A method for mapping resource units according to claim 1, wherein the system configuration information comprises: the number of frequency partitions, and the number of sub-bands, each of which is in a unit of N1 continuous physical resource units, in each frequency partition.

3. A method for mapping resource units according to claim 2, wherein the system configuration information also comprises: system bandwidth, and the number of physical resource units in the frequency partition.

4. A method for mapping resource units according to claim 1, wherein the value of N2 varies with system bandwidth.

5. A method for mapping resource units according to claim 4, wherein the value of N2 is 1 or 2.

6. A method for mapping resource units according to claim 3, wherein the step of dividing the physical resource unit set to obtain the first physical resource unit set in a unit of N1 continuous physical resource units comprises:

determining, according to the system configuration information, the number L of sub-bands divided from the physical resource unit set, wherein each of the sub-bands is in a unit of N1 continuous physical resource units;

dividing, in a unit of N1 continuous physical resource units, the physical resource unit set in a system bandwidth into M sub-bands, wherein each sub-band is in a unit of N1 continuous physical resource units;

extracting uniformly L sub-bands, each of which is in a unit of N1 continuous physical resource units, from the M sub-bands, and putting the extracted sub-bands into the first physical resource unit set.

7. A method for mapping resource units, comprising dividing physical resource unit set to obtain a first physical resource unit set which is in a unit of N1 continuous physical resource units, and a second physical resource unit set into which the remaining physical resource units are put;

permuting, in a unit of N2 continuous physical resource units, the physical resource units in the second physical resource unit set;

allocating, in a unit of N1 continuous physical resource units, the physical resource units in the first physical resource unit set to each frequency partition, and allocating, in a unit of one physical resource unit, the permuted physical resource units in the second physical resource unit set to each frequency partition;

wherein the step of dividing the physical resource unit set to obtain the first physical resource unit set in a unit of N1 continuous physical resource units is performed by a base station according to system configuration information, wherein the system configuration information comprises: the number of frequency partitions, and the number of sub-bands, each of which is in a unit of N1 continuous physical resource units, in each frequency partition and wherein the step comprises:

dividing, according to the number of the physical resource units in each frequency partition, the physical resource units in the physical resource unit set into parts, wherein the number of the parts is equivalent to the number of frequency partitions; in the part of physical resource units corresponding to each frequency partition, sequentially extracting (N1×pi) continuous physical resource units starting from the start unit, and putting the extracted physical resource units into the first physical resource unit set, wherein pi represents the number of sub-bands, each of which is in a unit of N1 continuous physical resource units, in the $i^{th}$ frequency partition.

8. A method for mapping resource units comprising, dividing physical resource unit set to obtain a first physical resource unit set which is in a unit of N1 continuous physical resource units, and a second physical resource unit set into which the remaining physical resource units are put;

permuting, in a unit of N2 continuous physical resource units, the physical resource units in the second physical resource unit set;

allocating, in a unit of N1 continuous physical resource units, the physical resource units in the first physical resource unit set to each frequency partition, and allocating, in a unit of one physical resource unit, the permuted physical resource units in the second physical resource unit set to each frequency partition;

wherein the step of dividing the physical resource unit set to obtain the first physical resource unit set in a unit of N1 continuous physical resource units is performed by a base station according to system configuration information, wherein the system configuration information comprises: system bandwidth, the number of physical resource units in the frequency partition, the number of frequency partitions, and the number of sub-bands, each of which is in a unit of N1 continuous physical resource units, in each frequency partition and wherein the step comprises:

dividing, according to the number of the physical resource units in each frequency partition, the physical resource units in the physical resource unit set into parts, wherein the number of the parts is equivalent to the number of frequency partitions; in the part of physical resource units corresponding to each frequency partition, sequentially extracting (N1×pi) continuous physical resource units starting from the start unit, and putting the extracted physical resource units into the first physical resource unit set, wherein pi represents the number of sub-bands, each of which is in a unit of N1 continuous physical resource units, in the $i^{th}$ frequency partition.

* * * * *